United States Patent [19]

Aizawa et al.

[11] Patent Number: 5,600,962

[45] Date of Patent: Feb. 11, 1997

[54] AIR CONDITIONER

[75] Inventors: Yukio Aizawa, Ojimmachi; Kouji Fujitani, Oota; Haruyuki Kaeriyama, Oota; Kenji Kobayashi, Oota; Katsuhiro Tsuda, Ooizumimachi, all of Japan

[73] Assignee: Sanyo Electric Co., Ltd., Osaka-fu, Japan

[21] Appl. No.: 334,183

[22] Filed: Nov. 3, 1994

[30] Foreign Application Priority Data

Nov. 12, 1993 [JP] Japan ................................ 5-283572
Nov. 24, 1993 [JP] Japan ................................ 5-293342

[51] Int. Cl.$^6$ ............................................ F25B 41/04
[52] U.S. Cl. ............................ 62/204; 62/222; 62/324.6
[58] Field of Search ........................ 62/204, 222, 527, 62/528, 205, 324.6

[56] References Cited

U.S. PATENT DOCUMENTS

| | | | |
|---|---|---|---|
| 2,434,593 | 1/1948 | Schultz et al. | 62/205 |
| 4,637,220 | 1/1987 | Sakano | 62/204 X |
| 4,688,390 | 8/1987 | Sawyer | 62/205 X |
| 4,720,982 | 1/1988 | Shimizu et al. | 62/204 |
| 4,912,937 | 4/1990 | Nakamura et al. | 62/324.6 X |
| 5,177,972 | 1/1993 | Sillato et al. | 62/205 |
| 5,222,371 | 6/1993 | Doyama et al. | 62/204 |

FOREIGN PATENT DOCUMENTS

| | | |
|---|---|---|
| 364834 | 4/1990 | European Pat. Off. . |
| 466431 | 1/1992 | European Pat. Off. . |
| 482629 | 4/1992 | European Pat. Off. . |
| 2257243 | 1/1993 | United Kingdom . |

*Primary Examiner*—William E. Tapolcai
*Attorney, Agent, or Firm*—Darby & Darby, PC

[57] ABSTRACT

An air conditioner including an outdoor unit containing a compressor and an outdoor heat exchanger therein, at least one indoor unit having both of an indoor heat exchanger and an electric expansion valve, and a pressure reducing member which is linked to the electric expansion valve in parallel in a refrigerant circuit and serves as resistance to refrigerant flowing therethrough. The valve opening degree of the electric expansion valve of the indoor unit when a room heating operation is stopped is set to be smaller than the valve opening degree of the electric expansion valve of the indoor unit when the room heating operation is conducted, and the resistance value of the pressure reducing member is set to be smaller than the resistance value to be provided to the refrigerant in accordance with the valve opening degree of the electric expansion valve when the room heating operation is stopped.

5 Claims, 8 Drawing Sheets

AIR CONDITIONER

BACKGROUND OF THE INVENTION

1. Field of the Invention

This invention relates to a multiroom air conditioner or heat-pump type air conditioner for blowing out heat-exchanged air.

2. Description of Related Art

In the air conditioner, there has been known a multiroom air conditioner in which plural indoor units each having an indoor heat-exchanger and an electric expansion valve are linked in parallel to a single outdoor unit having a compressor and an outdoor heat-exchanger. This type of air conditioner is disclosed in U.S. Pat. No. 5,222,371, for example.

In this type of air conditioner, condensed liquid refrigerant is frequently trapped in an indoor heat exchanger when an electric expansion valve is completely closed at the stop time of a room heating operation or the like. Therefore, the air conditioner falls into a gas-lacking state, and thus reduction in capacity is unavoidable. In order to avoid this problem, even when the room heating operation is ceased, the electric expansion valve is kept opened with smaller opening degree than that during the room heating operation, thereby preventing the trap of the refrigerant in the indoor heat-exchanger when the room heating operation is ceased.

As described above, the electric expansion valve is kept somewhat opened, so that the sound of refrigerant occurs in the expansion valve to induce noise. Particularly with respect to the electric expansion valve, the valve opening degree of the electric expansion valve is controlled by an electric motor (pulse motor), and thus there is a fact that it is difficult to accurately set the valve opening degree to a desired value due to a rotation error of the motor, etc. In addition, there is another fact that gas-liquid mixed refrigerant flows through the expansion value during the room heating operation and during the stop of the room heating operation. The sound (noise) of the refrigerant as described above is extremely magnified by a multiplied effect of these facts.

SUMMARY OF THE INVENTION

An object of the present invention is to provide an air conditioner in which refrigerant is allowed to flow into an indoor heat-exchanger even at the stop time of a room heating operation like during the heating operation, whereby occurrence of noise of refrigerant is suppressed not only when the room heating operation is performed, but also when the room heating operation is stopped, and reduction in air conditioning capacity is prevented.

Another object of the present invention is to provide an air conditioner having a compact heat-exchanger having excellent capacity accommodated in a main body on which a conventional heat-exchanger is mounted, to thereby minimize cost-up of the air conditioner, but maximize a heat-exchange performance of the air conditioner.

In order to attain the above objects, according to a first aspect of the present invention, the opening degree of the electric expansion valve of an indoor unit when a room heating operation is stopped is set to be smaller than that when the room heating operation is carried out, and a pressure reducer is provided in parallel to the electric expansion valve. The resistance value of the pressure reducer is set to be smaller than the resistance value corresponding to the opening degree of the electric expansion valve when the room heating operation is stopped.

According to the first aspect of the present invention, refrigerant flowing out from the indoor heat exchanger is guided in larger amount to the pressure reducer than to the electric expansion valve when the room heating operation is stopped, so that the noise of the refrigerant which is mainly induced due to the flow of the refrigerant into the expansion valve can be reduced.

Further, according to a second aspect of the present invention, the opening degree of the electric expansion valve when the room heating operation is carried out is set to be larger to thereby lower a pressure-reducing resistance value of the electric expansion valve, and an auxiliary pressure reducer for compensating for the lowering of the pressure-reducing resistance value is provided in a liquid pipe which links the electric expansion valve and the outdoor heat exchanger to each other and is located in the indoor unit. Accordingly, after the refrigerant flowing out from the indoor heat exchanger in the heat operation is passed through the electric expansion valve whose pressure-reducing resistance value is lowered, the pressure of the refrigerant is reduced again in the auxiliary pressure reducer.

According to a third aspect of the present invention, at least one of both end plates of the heat exchanger is extended in the width direction of a ventilation path (room), and the distance between the both end plates of the heat exchanger is set to be substantially equal to the width of the ventilation path. Therefore, even when the heat exchanger is designed to be shorter in its width direction than the width of the ventilation path, the heat exchanger can be easily fixed to the ventilation path with the extended end plate.

Further, the inside of a main body is partitioned into a ventilation path room and an electrical-equipment room by a partition plate, and one of both end plates of the heat exchanger accommodated in the ventilation path room, which is located at the electrical-equipment room side, is extended so that the apparent width of the heat exchanger between the both end plates thereof is substantially equal to the width of the ventilation path. Therefore, electrical equipments (parts) in the electrical-equipment room suffer little heat effect (radiation heat) from the heat exchanger, and thus the equipments can be prevented from being damaged by the heat exchanger. Still further, a closing member is filled in a space which is defined by the extended end plate and the wall surface of the ventilation path to allow gas to smoothly flow through the ventilation path, so that noise or unpleasant sound hardly occurs.

According to a fourth aspect of the present invention, the air conditioner for blowing heat-exchanged air from a blow-out port provided on a front panel of the main body includes a case defining a ventilation path, a partition plate which is arranged in the case and serves to partition the inside of the case into a ventilation path (room) for blowing the air through the case and an electrical equipment room in which electrical parts are accommodated, a front plate which is accommodated in the electrical equipment room so as to be disposed along the front panel of the main body and holds a mount member to which the electrical parts are secured, and a rear plate which has one end portion supporting the back side of the front plate and the other end portion fixed to the case and serves to support the front plate so that a space is formed between the front plate and the case. Electrical parts are also secured to the plate surface of the rear plate.

According to the fourth aspect of the present invention, the accommodation space for the electrical parts can be effectively used. In addition, if light electrical parts such as a print board, etc. are mounted on the front plate and weighty electrical parts such as a transformer, etc. are mounted on the rear plate, a work for securing the mount member to the electrical-equipment room can be facilitated because it is light at the front side and weighty at the rear side and thus its weight balance meets the securing work. Further, if electrical parts for which service or maintenance is frequently required are mounted on the front plate (not rear plate), the service and the maintenance can be performed from the front side of the main body, so that workability can be improved.

DETAILED DESCRIPTION OF PREFERRED EMBODIMENTS

Figure 1:
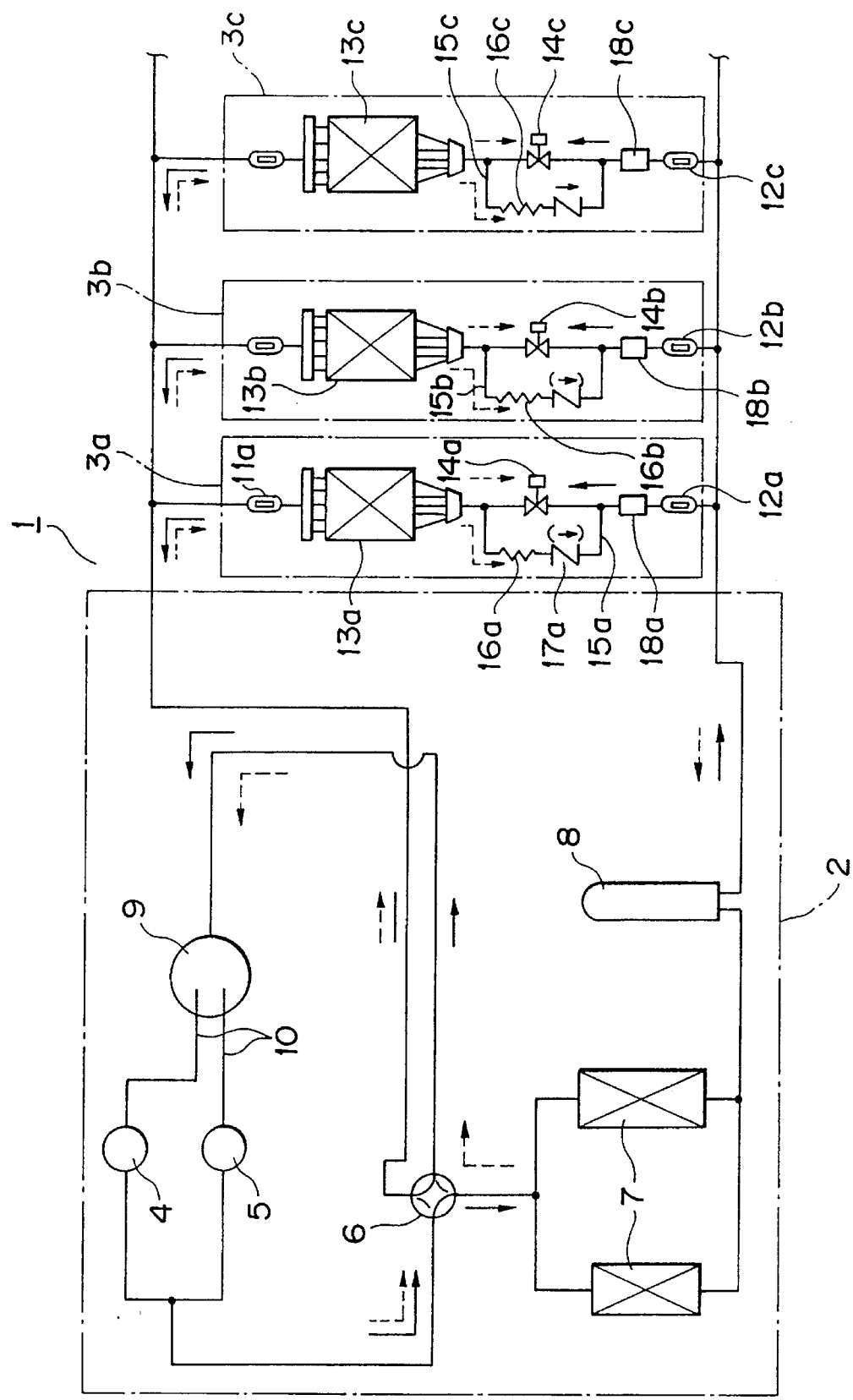
FIG. 1 is a refrigerant circuit diagram for a multiroom air conditioner of a first embodiment according to the present invention.

Preferred embodiments according to the present invention will be described hereunder with reference to the accompanying drawings.

Reference numeral 1 represents a multiroom air conditioner in which plural indoor units 3a, 3b and 3c are linked in parallel to one outdoor unit 2 through a refrigerant pipe.

The outdoor unit 2 includes a capacity-variable compressor 4 and a rated (capacity-invariable) compressor 5 which are connected to each other in parallel. The outdoor unit 2 further includes a four-way change-over valve 6 which is selectively switchable between a state as indicated by a solid line during a room cooling operation and a state as indicated by a broken line during a room heating operation, and allows refrigerant discharged from the compressors 4 and 5 to flow in a direction as indicated by a solid-line arrow during the room cooling operation and to flow in a direction as indicated by a broken-line arrow during the room heating operation. The outdoor unit 2 further includes outdoor heat exchangers which are arranged in parallel. Each of the outdoor heat exchangers serves as a condenser during the room cooling operation and also serves as an evaporator during the room heating operation. The outdoor unit 2 further includes a receiver tank 8, and an accumulator 9 which is linked to gas suction pipes 10 of the compressors 4 and 5.

Figure 5:
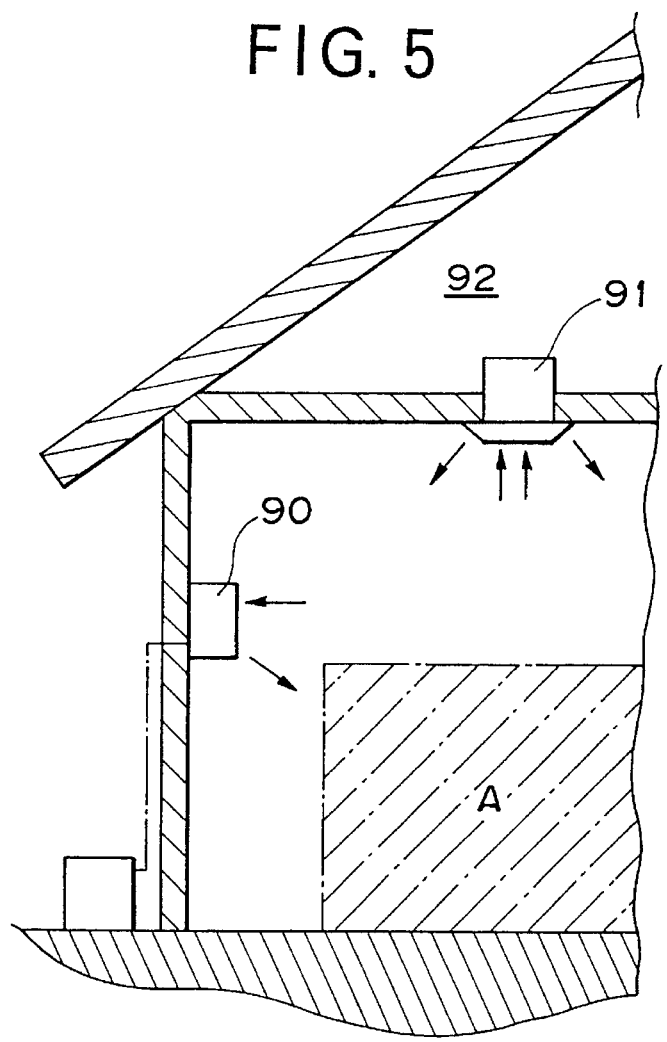
FIG. 5 is a cross-sectional view showing a set-up state of an indoor unit of the air conditioner.

The indoor unit 3a is of a wall mounting type as shown in FIG. 5. As shown in FIG. 1, the indoor unit 3a includes strainers 11a and 12a, an indoor heat exchanger 13a which serves as an evaporator during the room cooling operation and also serves as a condenser during the room heating operation, an electric expansion valve 14a (hereinafter referred to as "electric valve"). The valve opening degree of the electric valve 14a is controlled by a pulse motor which is contained in the electric valve, and it is fully opened for 480-pulse and fully closed for 0-pulse. The valve opening degree of the electric valve will be described later.

The indoor unit 3a further includes a by-pass pipe 15a serving as a by-pass for the electric valve 14a. A pressure reducer 16a (hereinafter referred to as "capillary tube") and a check valve 17a are linked to each other in series in the by-pass pipe 15a. The check valve 17a is closed during the room cooling operation and opened during the room heating operation by pressure of the refrigerant.

Figure 2:
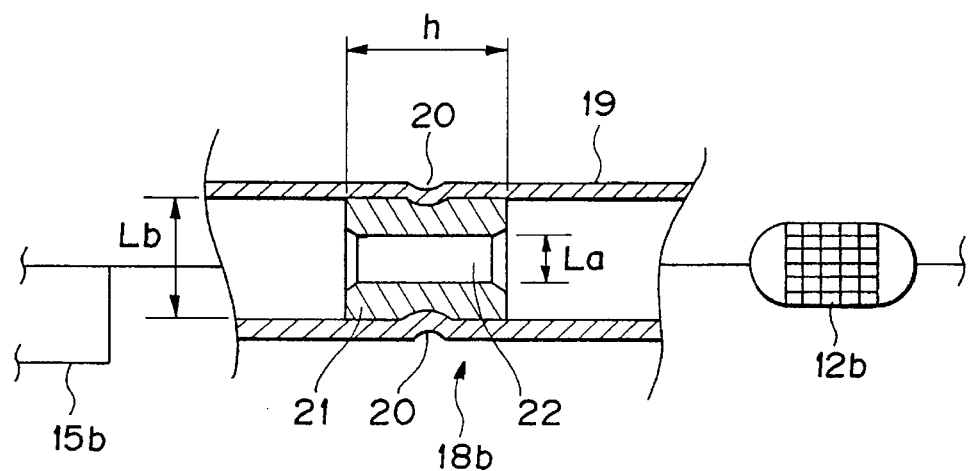
FIG. 2 is a cross-sectional view of an auxiliary pressure reducer (orifice)

The indoor unit 3a further includes an auxiliary pressure reducer 18a, and an orifice is used as the auxiliary pressure reducer 18a in this embodiment. The structure of the orifice is shown in FIG. 2. The other indoor units 3b and 3c have the same elements as the indoor unit 3a. The same elements are represented by the same reference numerals, and the duplicate description thereof is omitted.

In order to perform the room heating operation on all the indoor units 3a, 3b and 3c in the multiroom air conditioner 1 thus constructed, each of the electric valves 14a, 14b and 14c of the indoor units 3a, 3b and 3c is controlled to have an opening degree which meets its room heating load. On the other hand, in the outdoor unit 2, the driving condition of the two compressors 4 and 5 is controlled on the basis of the sum value of the room heating loads of the respective indoor units. That is, the driving condition of the outdoor unit 2 is controlled in accordance with the room heating loads of the indoor units 3a, 3b and 3c.

For example, when only the heating load of the indoor unit 3a is set to "0" (the heating loads of the other indoor units 3b, 3c are not set to "0"), the room heating operation of the indoor unit 3a is ceased. Specifically, the driving operation of an indoor air blower (not shown) of the indoor unit 3a is ceased and the pulse motor of the electric valve 14a is set to 85-pulse. The 85-pulse means an opening degree of about 17% ($^{85}/_{480}$). Here, 115-pulse is set in the ordinary room heating operation, and the opening degree in this case is about 23% ($^{115}/_{480}$). That is, the opening degree of the electric valve 14a at the stop time of the room heating operation is set to be smaller than that during the room heating operation.

The electric valve 14a is set to be slightly opened as described above even during the stop of the room heating operation because even when condensed refrigerant is trapped in the indoor heat exchanger 13a, the trapped refrigerant is allowed to be returned to the outdoor unit 2 through the electric valve 14a and the by-pass pipe 15a. In some type of air conditioner, the trap amount of the condensed refrigerant is experimentally measured to be 0.3 to 0.4 liter. The resistance value of the capillary tube 16a which is provided to the by-pass pipe 15a is set to be smaller than the resistance value corresponding to the opening degree of about 17% of the electric valve 14. Accordingly, a larger amount of refrigerant which is condensed in the indoor heat exchanger 13a at the stop time of the room heating operation of the indoor unit 3a is liable to flow toward the by-pass pipe 15a having the capillary tube 16a than toward the electric valve 14a (see a one-dotted chain line arrow in FIG. 1). Therefore, the noise of the refrigerant hardly occurs in the electric valve 14a.

The resistance value of the electric valve 14a is not necessarily set to a fixed value at all times due to a rotation error of the pulse motor of the electric valve 14a (it is difficult to accurately set the pulse to 85-pulse) or the like. On the other hand, the capillary tube 16a has the resistance value which is kept invariable at all times, and thus the refrigerant is liable to flow into the capillary tube 16a. Therefore, the stable refrigerant flow can be also obtained in the indoor unit 3a at the stop time of the room heating operation.

In order to prevent the trap of the refrigerant as described above, the difference between the opening degrees when the room heating operation is stopped and when the room heating operation is performed is preferably set to 1 to 5%.

Next, the indoor unit 3b during the room heating operation will be described.

An indoor air blower (not shown) is rotated and the opening degree of the electric valve 14b is adjusted in accordance with the room heating load of the indoor unit 3b. The adjustment means that the pressure-reducing resistance value is slightly reduced with respect to the room heating load. For example, when the valve opening degree is originally required to be set to about 23% ($^{115}/_{480}$), the valve opening degree is more reduced by about 2% and thus it is set to about 25% ($^{120}/_{480}$) (that is, the opening degree is set to a larger value). The opening degree is preferably set to be larger by 1% to reduce the pressure-reducing resistance. If the opening degree is set to be less than 1%, the noise is magnified due to the rotation error of the pulse motor of the electric valve.

In order to compensate for the deficiency of the resistance value (2%) due to the reduction of the resistance value as described above is provided the auxiliary pressure-reducer 18b as described above. Accordingly, the refrigerant in the indoor unit 3b during the room heating operation behaves as follows.

First, the gas-liquid mixed refrigerant which is condensed in the indoor heat exchanger 13b is reduced in pressure by the electric valve 14b whose valve opening degree is set to be slightly larger. The noise of the refrigerant in the electric valve 14b is suppressed to be small because the valve opening degree is set to be slightly larger. The refrigerant which has been reduced in pressure to be liquefied in the electric valve 14b is reduced in pressure by the auxiliary pressure reducer 18b again, and then returned to the outdoor unit 2. Accordingly, the refrigerant noise hardly occurs in the indoor unit 3b during the room heating operation like the indoor unit 3a at the stop time of the room heating operation.

The orifice serving as the auxiliary pressure reducer 18b has a main body 21 which is fixed by dowels 20 provided to the refrigerant pipe 19 as shown in FIG. 2. The main body 21 has a hole 22 of 2.5 mm in inner diameter (La) and 8 mm in length (Lb). The inner diameter Lb of the refrigerant pipe is set to about 7 mm.

In the room cooling operation, the refrigerant passing through the indoor unit 3a (electric valve 14a) is kept substantially liquefied, so that the refrigerant noise occurring in the electric valve 14a is smaller than the noise of the refrigerant in the room heating operation, which passes through the indoor unit 3a in the gas-liquid mixed state. Therefore, no problem occurs on the refrigerant noise in the room cooling operation.

The valve opening degree of the electric valve 14a in the room cooling operation is set to 4% ($^{20}/_{480}$ pulse). That is, the valve opening degree in the room cooling operation is set to be smaller than that in the room heating operation. This is because the indoor heat exchanger 13a acts as a low pressure side for a refrigerating cycle and thus the refrigerant in the indoor heat exchanger 13a is attracted to the outdoor unit 2 (compressors 4 and 5), so that it is unnecessary to forcedly increase the valve opening degree.

Figure 3:
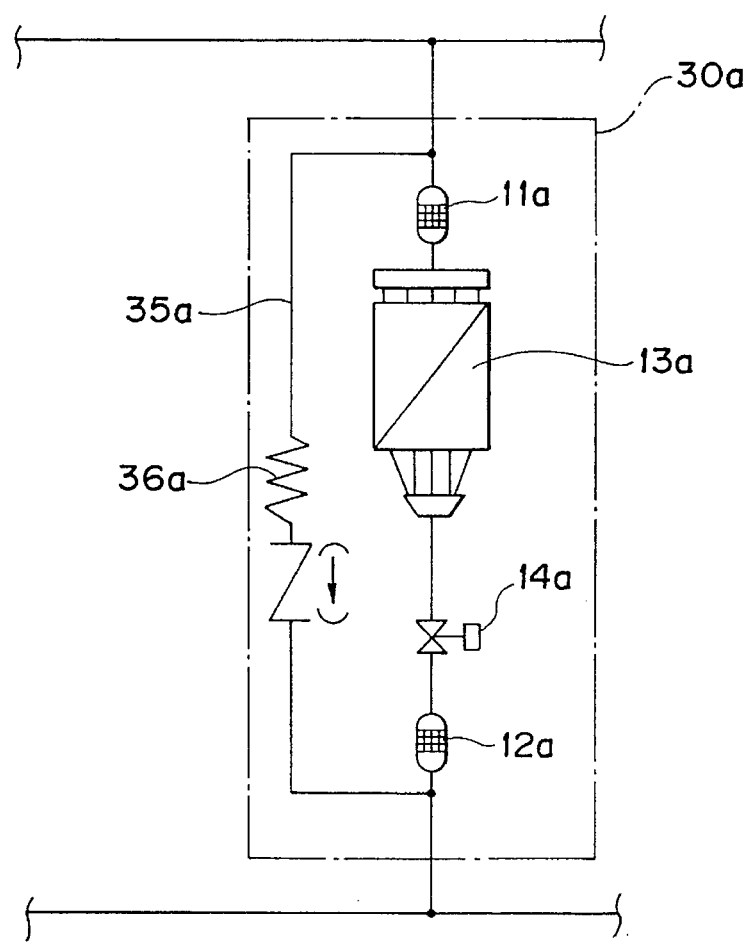
FIG. 3 is a refrigerant circuit diagram for an air conditioner of a second embodiment according to the present invention.

FIG. 3 shows a second embodiment of the indoor unit. In this embodiment, the same elements as those of FIG. 1 are represented by the same reference numerals, and the description thereof is omitted. The different point from the indoor unit shown in FIG. 1 resides in that a by-pass pipe 35a is disposed to serve as a by-pass for the indoor heat exchanger 13a and the electric valve 14a. In this embodiment, the resistance value of a capillary tube 36a is set to be smaller than the resistance value of the valve opening degree of about 17% (valve opening degree during the stop of the room heating operation).

Accordingly, the refrigerant flowing into the indoor unit 30a during the stop of the room heating operation flows toward the by-pass pipe 35a in larger amount than toward the indoor heat exchanger 13a. Therefore, as compared with the embodiment shown in FIG. 1, the refrigerant circulating speed is more increased because no refrigerant flows into the indoor heat exchanger 13a, and the room heating performance is improved.

Figure 4:
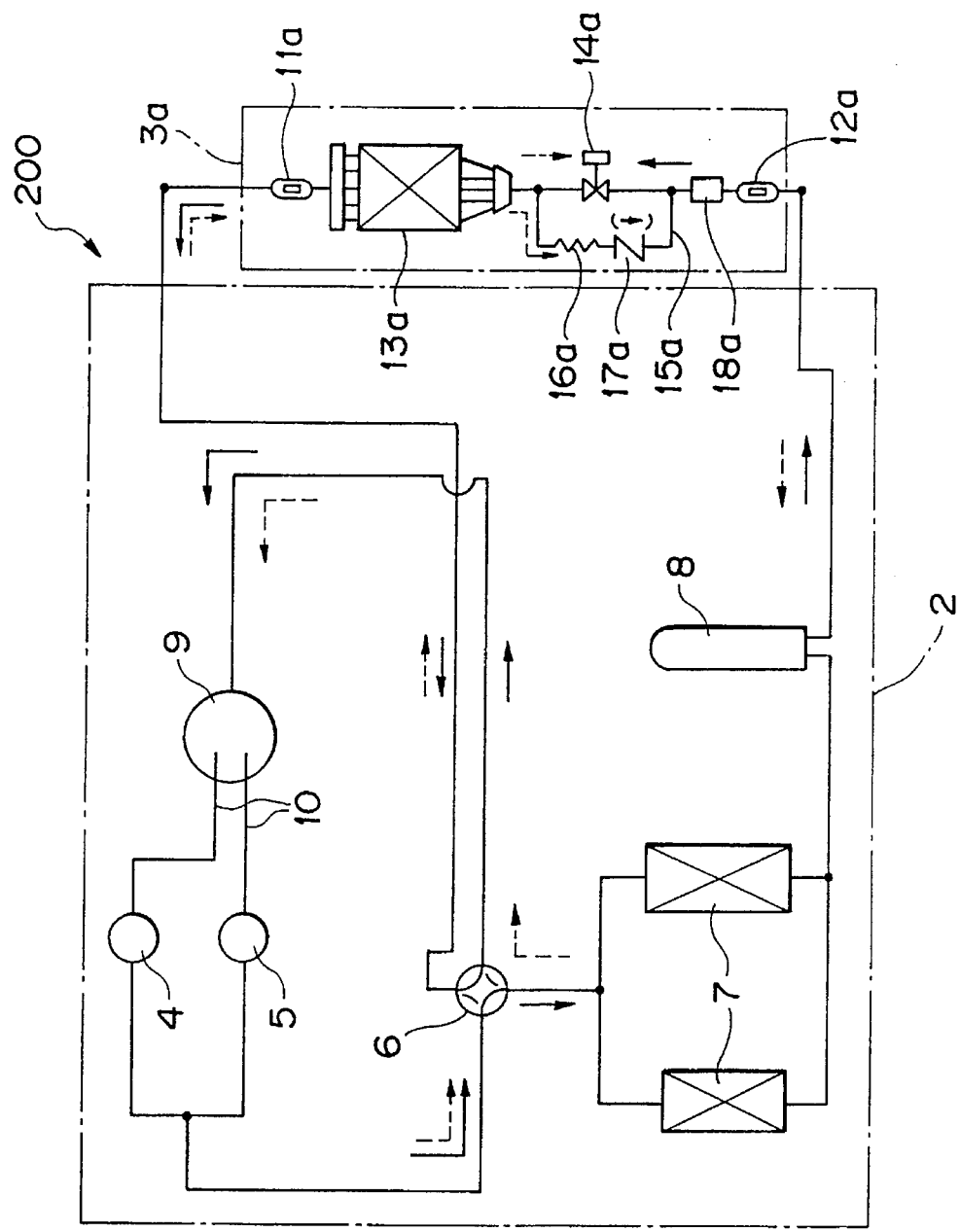
FIG. 4 is a refrigerant circuit diagram for an air conditioner of a third embodiment according to the present invention.

FIG. 4 shows a third embodiment of the present invention. This embodiment relates to a general heat-pump type air conditioner having only one indoor unit 3a. The same elements as the air conditioner of the first embodiment shown in FIG. 1 are represented by the same reference numerals, and the duplicate description of the same elements is omitted from the following description.

The same effect as the first embodiment can be obtained in the third embodiment.

When the indoor unit 3a as described above is of a wall mounting type 90 as shown in FIG. 5, it is located nearer to the living space than a ceiling-suspending type indoor unit which is secured to the ceiling 92 of a room, and thus an user in the living space is more sensitive to the noise of the indoor unit 3a. Accordingly, the suppression of the noise of the indoor unit as described above is more effective for an air conditioner.

Next, the construction of the indoor unit 3a will be described.

Figure 6:
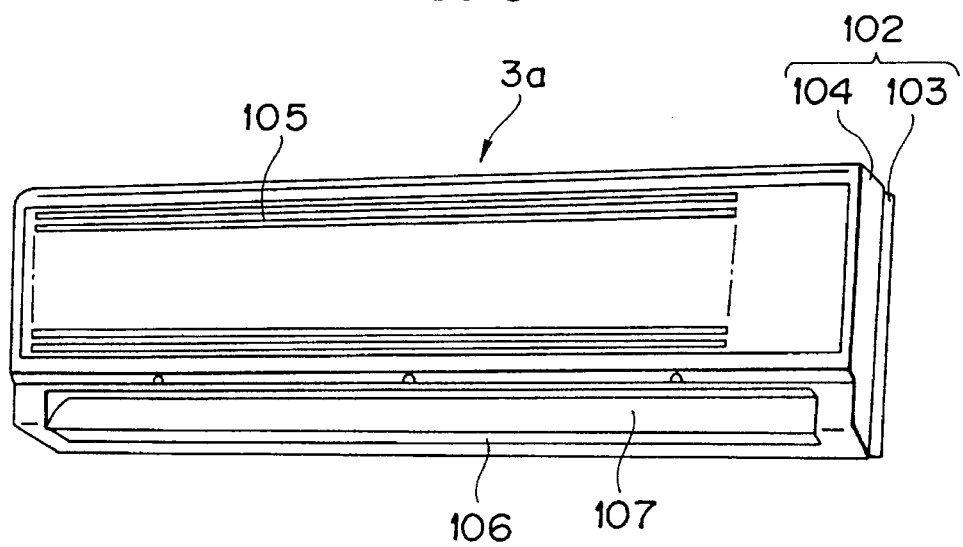
FIG. 6 is a perspective view of the indoor unit of the air conditioner.

In this embodiment, the indoor unit 3a is secured to the wall of the room as shown in FIG. 6, and thus it is called as "wall mounting type". An outer body 102 of the indoor unit has a main body 103 which is opened at the front side thereof (see FIG. 7) and a front panel 104 which is secured to the front side of the main body 103. An air suction grill 105 and an outlet (air blow-out) port 106 are formed at the upper and lower portions of the front panel 104, respectively. Reference numeral 107 represents a wind-direction varying plate which is disposed at the air blow-out port.

Figure 7:
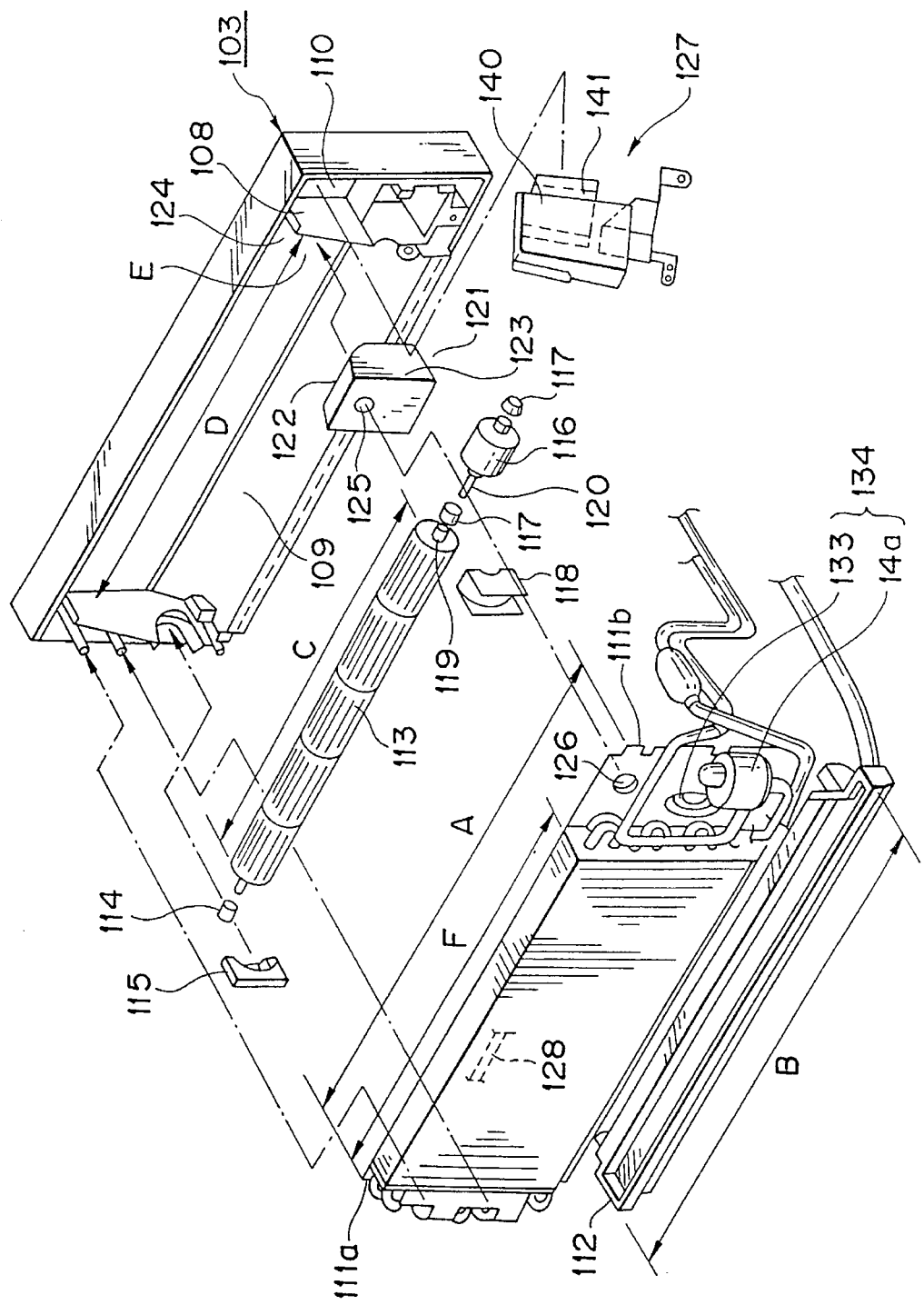
FIG. 7 is an exploded perspective view of a main body of the indoor unit shown in FIG. 6.

FIG. 7 is an exploded perspective view of the main body 103. The inside of the main body 103 is partitioned into a ventilation path (room) 109 and an electrical-equipment room 110 by a partition plate 108. In the ventilation room 109 are accommodated a heat exchanger 13a, a drain pan 112 for receiving water droplets which are dew-condensed on the heat exchanger 13a and discharging it to the outside, and a cross flow fan 113. The width A of the heat exchanger 13a between both of right and left end plates 111a and 111b, the width B of the drain pan 112 and the width of the cross flow fan 113 are set to be substantially equal to the width D of the ventilation path 109.

The indoor unit 102 further includes a bearing 114 for supporting a shaft of the cross flow fan, a bearing press 115 for fixing the bearing 114 to the main body 103, a motor 116 for driving the cross flow fan, bearing rubbers 117 which are engaged with the right and left sides of the motor, a bearing rubber press 118 for fixing the bearing rubber to the main body, and a boss 119 which is provided at the right side of the cross flow fan and fixed to the rotation shaft 120 of the motor 116.

Reference numeral 121 represents a closing member of foamed plastic such as polystyrene, and a pressure-sensitive adhesive double coated tape (not shown) is attached to the back surface 122 of the closing member 121. The side surface 123 of the closing member is pressed toward the back side of the main body 103 in contact with the wall of the partition plate 108 at the ventilation path 109 side so that the rear surface 122 of the closing member 121 abuts against the wall 124 of the ventilation path 109 of the main body 103. Through this operation, the closing member 121 is fixed to the ventilation path 109.

Reference numeral 125 represents a projection provided on the front surface of the closing member 121, and the heat exchanger 13a is positioned by inserting the projection 125 into a hole 126 of the right end plate 111b of the heat exchanger 13a. Through this operation, a space E which is defined by the right end plate 111b of the heat exchanger 13a and the wall 124 of the ventilation path 109 is filled with the closing member 121.

Reference numeral 127 represents a mount member which is accommodated in the electrical-equipment room 110 of the main body 103, and the details thereof will be described with reference to FIGS. 10 and 11.

Figure 8:
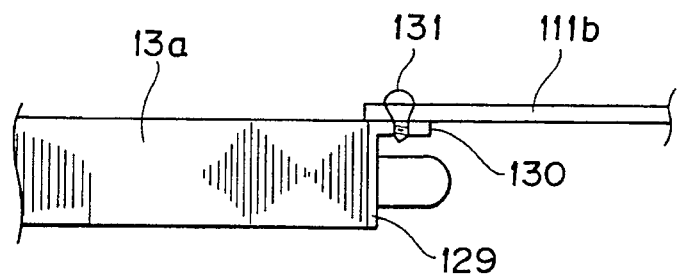
FIG. 8 is a plan view showing the relationship between a tubesheet and a right end plate of an indoor heat exchanger shown in FIG. 7.

The pipe 128 of the heat exchanger 13a is subjected to a narrowing treatment (7 mm), etc. to improve the efficiency of the heat exchanger 13a, and thus the width F of the heat exchanger 13a itself is set to be smaller than the width D of the ventilation path 109. Therefore, in order to meet the width of the heat exchanger to that of the ventilation path 109, the extension end portion 111b having a flat plate shape is secured to a rear piece of the L-shaped end plate 129 at the right side of the heat exchanger 13a as shown in FIG. 8. As described above, the L-shaped end plate 129 which is one of the both end plates of the heat exchanger 13a is extended in the width direction of the heat exchanger 13a with the extension end portion 111b to substantially coincide the distance A between the other end plate 111a and the extension end portion 111b with the width D of the ventilation path 109. In addition, the extension end portion 111b is disposed at the electrical-equipment room 110 side in the ventilation path 109. Therefore, the heat exchanger 13a and the electrical-equipment room 110 are disposed away from each other at a large distance, so that the parts in the electrical-equipment room 110 are prevented from being effected by heat radiation (cooling or heating) from the heat exchanger 13a.

The extension end portion 111b may be formed integrally with the end plate 129 so that a part of the end plate 129 is projected therefrom.

Reference numeral 14a represents an expansion valve and reference numeral 133 represents a capillary tube, and these elements constitutes a refrigerating device 134 linked to the heat exchanger 13a. These elements are disposed near to the extension end portion 111b (at the front side), and the heat exchanger 13a and the refrigerating device 134 are arranged in the width direction of the ventilation path 109. With this arrangement, the heat exchanger 13a and the refrigerating device 134 are located beneath the drain pan 112. Accordingly, drain water attached to the refrigerating machine 134 and the extension end portion 111b is surely received by the drain pan like drain water attached to the heat exchanger 13a.

Figure 9:
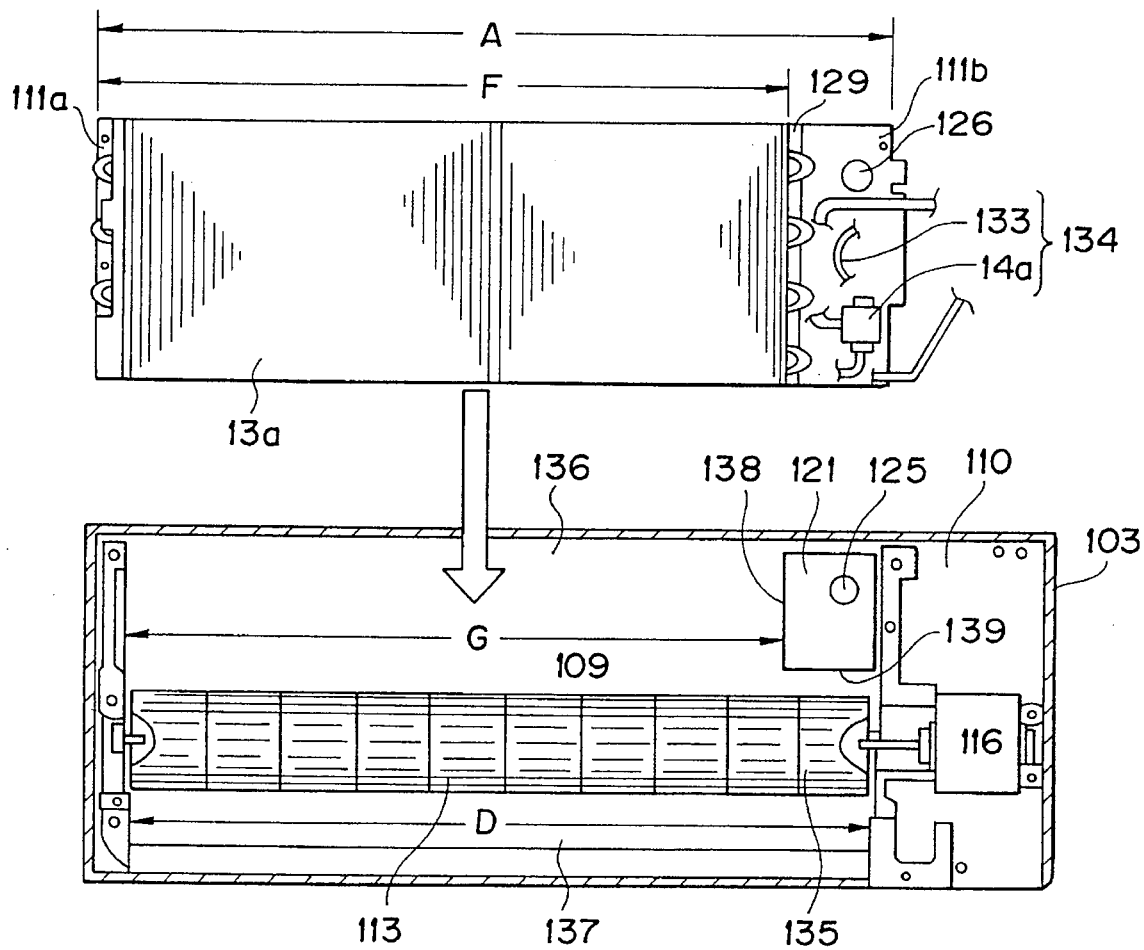
FIG. 9 is a cross-sectional view showing an indoor unit when the indoor heat exchanger shown in FIG. 7 is taken out.

FIG. 9 shows the relation between the main body 103 and the heat exchanger 13a. When the heat exchanger 13a is secured to the main body 103, the right side portion 135 of the cross flow fan 113 is hidden by the extension end portion 111b. Therefore, the actual width G of the air suction port 136 is smaller than the actual width D of the ventilation path 109 (the width of the air blow-out port 137). That is, the closing member 121 is embedded in the right side portion of the ventilation path which extends from the air suction port 136 to the air blow-out port 139, and thus no air flows in this space. Accordingly, a part of air which is sucked from the right side of the air suction port 136 is guided along the right side surface 138 and lower surface 139 of the closing member 121 and smoothly blown out from the air blowout port 137. Accordingly, there is no possibility that turbulent flow occurs in the ventilation path 109, and the noise is suppressed.

Figure 10:
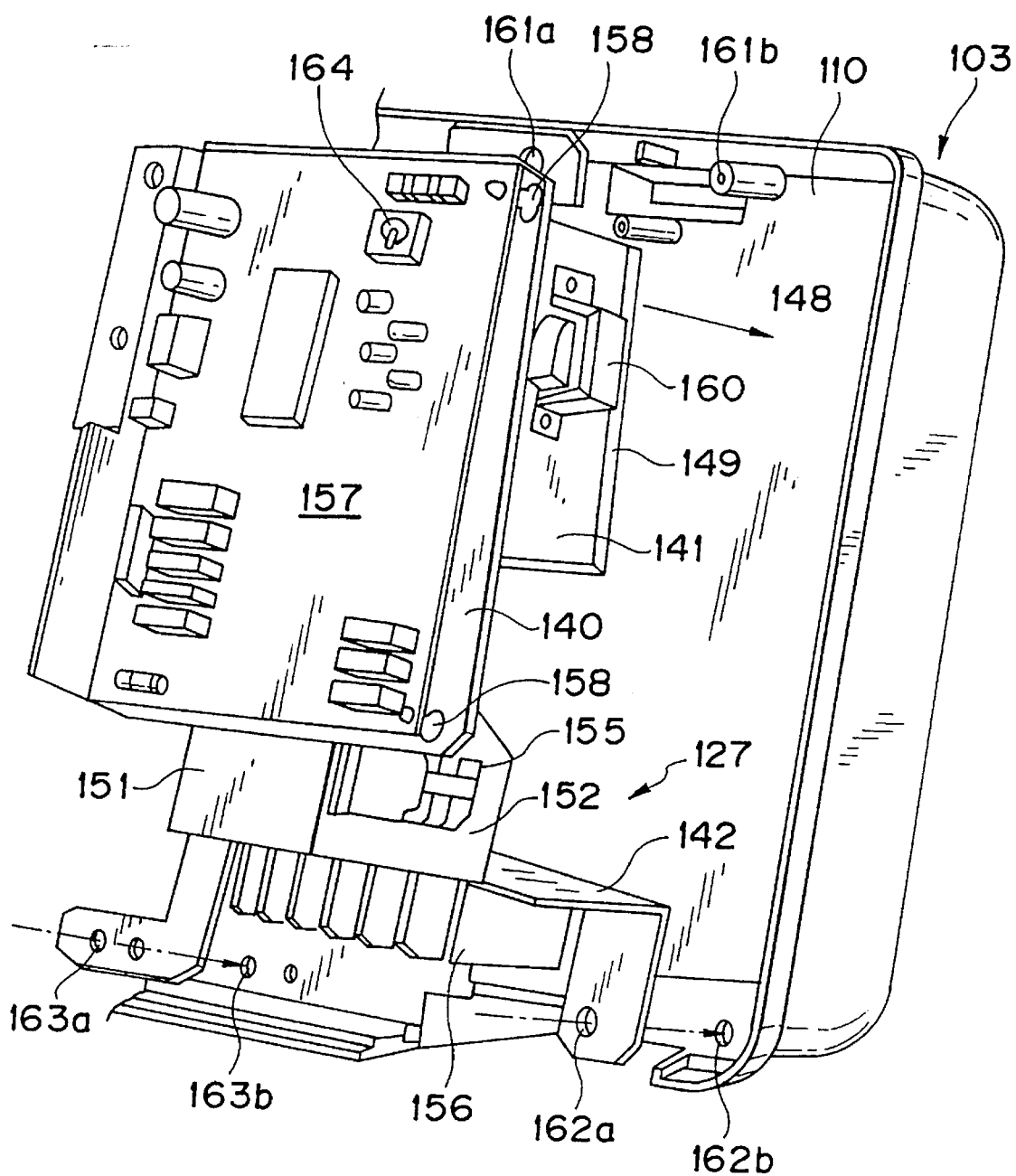
FIG. 10 is an exploded perspective view showing an electric equipment which is secured to the main body.
Figure 11:
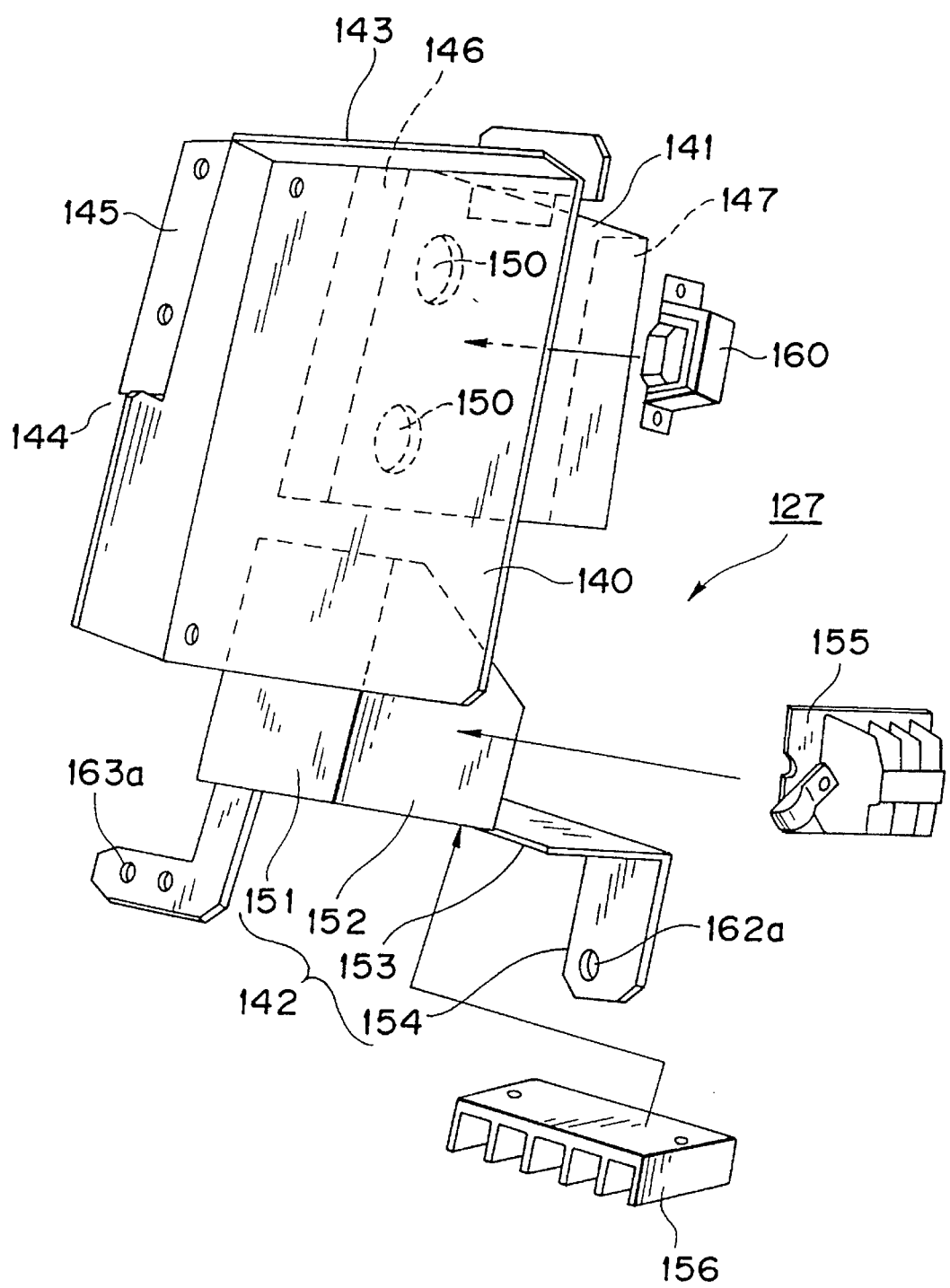
FIG. 11 is a perspective view of a mount member.

FIG. 10 is a perspective view showing the relation between the electrical-equipment room 110 of the main body 103 and the mount member 127 which is accommodated in the electrical-equipment room 110, and FIG. 11 is a perspective view of the mount member shown in FIG. 10.

In FIGS. 10 and 11, reference numeral 140 represents a front plate, reference numeral 141 represents a rear plate which is intersected to the back surface of the front plate and extends to the back side of the main body 103, and reference numeral 142 represents a support leg provided at the lower portion of the front plate. The mount member 127 is constructed by these elements.

An upper side 143 of the front plate 140 and a left side 144 of the front plate 140 which is located at the ventilation path side are designed to be erected, and the upper portion of the left side 144 is bent to the ventilation path side. Lead wires (not shown) of the electrical parts are extended along the bent portion 145 of the left side 144.

The rear plate 141 is designed in a substantially U-shape. The front portion 146 of the rear plate 141 is spot-welded to the back surface of the front plate 140, and the rear portion 147 of the rear plate 141 abuts against the wall 148 of the electrical-equipment room 110 of the main body 103 through a cushion. Reference numeral 150 represents an opening through which the lead wires are inserted. A transformer 160 serving as a second electrical part is secured to the rear plate 141 from the side direction.

The support leg 142 comprises a first piece 151 which abuts against the back surface of the front plate, a second piece 152 which extends from the first piece 151 to the lower side, a third piece 153 which extends from the second piece 152 to the lower side and a fourth piece 154 which is obtained by bending the tip of the third piece 153. A first terminal plate 155 is secured to the second piece 152 from the side direction, and a second terminal plate 156 is secured to the third piece 153 from the lower side. The first terminal plate 155 is connected to a lead wire of a remote controller (not shown) and the second terminal plate 156 is connected to a lead wire from the outdoor unit (not shown).

Reference numeral 157 represents a print board serving as a first electrical part, and it is secured to the front plate 140 in a float state with a fixture 158. The mount member 127 is accommodated in the electrical-equipment room 110 of the main body while the print board 157, the transformer 160, the terminal plates 155 and 156, etc. are fixed on the mount member 127 as described above. Through this accommodation, holes 161a, 162a and 163a which are formed on the respective sides of the mount member 127 are positionally coincident with the boss 161b and the securing holes 162b and 163b of the main body 3, and these holes are fixed to one another with screws to accommodate the electrical parts in the electrical-equipment room 110.

As described above, the light first electrical part is secured on the front plate 140, and the second electrical part which is weightier than the first electrical part is secured on the rear plate 141. That is, the transformer (second electrical part) which is weightier than the print board (first electrical part) is secured on the rear plate 141, so that the weight of the mount member 127 is adjusted to be light at the front side and weighty at the back side. Therefore, the mount member 127 is balanced in a good state, and a work for securing the mount member 127 to the electrical-equipment room 110, that is, a work for positionally coincide the holes 161a, 162a and 163a formed in the respective sides with the boss 161b and the securing holes 162b and 163b of the main body 3.

In this embodiment, the print board 157 provided with a switch 164, etc. for which service and maintenance are required is disposed at the front side of the electrical-equipment room 110, and the transformer 160, etc. for which the service and maintenance are less required is disposed at the rear side of the print board 157, whereby a setting work or an exchange work for electrical parts which require service and maintenance, such as a print board 157, can be more easily performed.

What is claimed is:

1. An air conditioner, comprising:

an outdoor unit containing a compressor and an outdoor heat exchanger therein;

plural indoor units, each of these having an indoor heat exchanger and an electric expansion valve, wherein said compressor, said outdoor heat exchanger, said electric expansion valve and said indoor heat exchanger are linked to one another in this order to constitute a refrigerant circuit; and a pressure reducing member which is linked to said electric expansion valve in parallel in the refrigerant circuit and serves as resistance to refrigerant flowing therethrough, wherein a valve opening degree of said electric expansion valve of said indoor unit when a room heating operation is stopped is set to be smaller than a valve opening degree of said electric expansion valve of said indoor unit when the room heating operation is performed, and the resistance value of said pressure reducing member is set to be smaller than the resistance value to be provided to the refrigerant in accordance with the valve opening degree of said electric expansion valve when the room heating operation is stopped.

2. The air conditioner as claimed in claim 1, wherein each of said indoor unit has a by-pass pipe serving as a by-pass for said electric expansion valve and said heat exchanger, and said pressure reducing member is disposed in said by-pass pipe.

3. A heat-pump type air conditioner operative in both a heating mode and a cooling mode, comprising:

a compressor;

a four-way change-over valve for reversing a refrigerant flow direction through a switching operation thereof;

an outdoor heat exchanger;

expansion valve means having a controllable opening degree for regulating refrigerant flow during both the heating mode and the cooling mode, means for controlling said expansion valve means so as to have an excess of opening degree during heating mode, thereby reducing noise produced by circulating refrigerant;

indoor heat exchanger; and an auxiliary pressure reducing member which is provided between said expansion valve means and said outdoor heat exchanger and compensates for the resistance value produced by the excess opening degree of said expansion valve means.

4. A heat-pump type air conditioner operative in both a heating mode and a cooling mode, comprising;

a compressor;

a four-way change-over valve for reversing a refrigerant flow direction through a switching operation thereof;

an outdoor heat exchanger:

expansion valve means having a controllable opening degree for regulating refrigerant flow during both the heating mode and the cooling mode;

indoor heat exchanger; and an auxiliary pressure reducing member which is provided between said electric expansion valve and said outdoor heat exchanger and compensates for the resistance value of said expansion valve means;

a pressure reducing member which is disposed in parallel to said expansion valve means and serves to provide resistance to refrigerant passing therethrough, wherein the resistance value of said pressure reducing member is set to be smaller than the resistance value to be provided to the refrigerant in accordance with the opening degree of expansion valve means when the room heating operation is stopped.

5. The air conditioner as claimed in claim 4, wherein each of said indoor units has a by-pass pipe serving as a by-pass for said expansion valve means and said heat exchanger, and said pressure reducing member is disposed in said by-pass pipe.

* * * * *

UNITED STATES PATENT AND TRADEMARK OFFICE
CERTIFICATE OF CORRECTION

PATENT NO. : 5,600,962
DATED : February 11, 1997
INVENTOR(S) : Yukio AIZAWA et al.

It is certified that error appears in the above-indentified patent and that said Letters Patent is hereby corrected as shown below:

On the title page: Item [75], Inventors, delete place of residence for each inventor. The section [75], Inventors, should read as follows: --Yukio AIZAWA, Kouji FUJITANI, Haruyuki KAERIYAMA, Kenji KOBAYASHI and Katsuhiro TSUDA, all of Gunma-ken, Japan--.

Signed and Sealed this

Fourteenth Day of October, 1997

Attest:

BRUCE LEHMAN

Attesting Officer

Commissioner of Patents and Trademarks